United States Patent [19]

Heinze

[11] Patent Number: 5,616,630
[45] Date of Patent: Apr. 1, 1997

[54] ESTER/URETHANE ACRYLATE HYBRID OLIGOMERS

[75] Inventor: Richard E. Heinze, Erie, Pa.

[73] Assignee: Lord Corporation, Cary, N.C.

[21] Appl. No.: 393,151

[22] Filed: Feb. 17, 1995

Related U.S. Application Data

[63] Continuation of Ser. No. 13,912, Feb. 5, 1993, abandoned.

[51] Int. Cl.$^6$ .............................. C08F 2/50; C08G 18/12; C08G 18/34; C08G 18/42
[52] U.S. Cl. ................. 522/96; 522/97; 522/104; 528/59; 528/65
[58] Field of Search ................. 522/90, 96, 97, 522/104, 174; 528/59, 65

[56] References Cited

U.S. PATENT DOCUMENTS

| | | | |
|---|---|---|---|
| 3,935,173 | 1/1976 | Ogasawara et al. | 522/104 |
| 3,984,500 | 10/1976 | Dickie et al. | 260/885 |
| 4,188,472 | 2/1980 | Chang | 522/90 |
| 4,246,379 | 1/1981 | Howard | 522/96 |
| 4,377,679 | 3/1983 | Schmidle | 528/75 |
| 4,390,565 | 6/1983 | Fonda | 427/44 |
| 4,512,910 | 4/1985 | Schmidle | 252/188.31 |
| 4,780,487 | 10/1988 | Kurpiewski et al. | 522/93 |
| 4,820,745 | 4/1989 | Müller et al. | 522/104 |
| 4,900,763 | 2/1990 | Kraushaar | 522/14 |
| 5,003,026 | 3/1991 | Ehrhart et al. | 528/49 |

*Primary Examiner*—Susan W. Berman
*Attorney, Agent, or Firm*—Wayne W. Rupert

[57] ABSTRACT

An ester/urethane acrylate hybrid oligomer which is the reaction product of an acrylate/hydroxy-functional polyester, an isocyanate compound, and a hydroxy-functional acrylate compound. The acrylate/hydroxy-functional polyester is prepared by reacting a polyester polyol and an acrylate compound. The polyester backbone of the oligomer has both ester and urethane linkages to the terminal acrylate functionality. This hybrid nature of the polyester backbone provides an oligomer which can be utilized at low viscosity to facilitate processing while maintaining effective stain resistance and flexibility.

12 Claims, No Drawings

ESTER/URETHANE ACRYLATE HYBRID OLIGOMERS

This is a continuation of application(s) Ser No. 08/013,912 filed on Feb. 5, 1993, now abandoned

FIELD OF THE INVENTION

The present invention relates to radiation-curable oligomers useful in coating compositions. More specifically, the present invention relates to an oligomer having both ester and urethane linkages between a polyester polyol backbone and terminal acrylate functionality.

BACKGROUND OF THE INVENTION

Acrylourethane oligomers have previously been utilized in combination with various acrylic monomers to produce radiation-curable protective coatings as well as radiation-curable vehicles for materials such as ceramic ink compositions. For example, U.S. Pat. No. 4,390,565 describes a radiation-curable ceramic ink composition containing an acrylated polycaprolactone diol polyurethane, an acrylic monomer, and a ceramic frit. U.S. Pat. No. 4,780,487 describes a radiation-curable coating composition having reduced gloss. The coating composition is a mixture of a polydiene-based acrylourethane oligomer and a standard acrylourethane oligomer. The coating composition also utilizes a reactive diluent system which can be one or more acrylic monomers.

A radiation-curable vehicle for ceramic enamels is described in U.S. Pat. No. 4,900,763. The radiation-curable vehicle contains acrylate or methacrylate modified oligomers, monofunctional acrylate or methacrylate modified monomers, pentafunctional acrylate or methacrylate modified monomers, and a photoinitiator system. The photoinitiator system is preferably a blend of a substituted thioxanthone compound, an ester of an aminobenzoic acid, and a 2-phenylacetophenone derivative.

U.S. Pat. No. 5,003,026 describes a radiation-curable no-wax floor covering which contains a polymerized urethane-acrylate oligomer which is the reaction product of an aromatic or cycloalkyl diisocyanate, a monohydroxy monoacrylate, and a phthalic polyester polyol.

U.S. Pat. Nos. 4,377,679 and 4,512,910 disclose photocurable compositions prepared by reacting a polyether diol and an acrylic acid in about equal molar proportions to form a reaction product and then reacting the reaction product with a hydroxyalkylacrylate and an organic diisocyanate in about equal molar proportions.

It has been discovered that many of the urethane-acrylate oligomers traditionally utilized in acrylourethane-based radiation-curable compositions, such as those described above, tend to be highly viscous in nature and therefore create processing problems when utilized in coating compositions. Specifically, many previous urethane-acrylate oligomers have viscosities ranging from 100,000 to 1,000,000 centipoise (cps) and therefore require substantial dilution with reactive diluent monomers in order to be utilized in radiation-curable coating compositions. Consequently, typical radiation-curable compositions contain 70 to 90 percent by weight diluent monomers.

The dilution of oligomers with reactive diluent monomers often results in an impairment of the performance of the resulting coating composition since the desirable properties of the oligomer tend to be overcome by the large amount of monomers present. For example, many of the traditional acrylourethane oligomer-based compositions do not maintain sufficient stain resistance and flexibility once the viscosity has been reduced to an acceptable level for processing. Furthermore, the reactive diluent monomers are typically very expensive and therefore substantially increase the cost of the overall radiation-curable composition. The reactive diluent monomers are also typically toxic in nature and thereby create health and environmental hazards.

A need therefore exists for a radiation-curable oligomer which can be utilized in coating compositions at viscosities low enough for acceptable processing. Such an oligomer should also maintain sufficient stain resistance and flexibility at these low viscosities.

SUMMARY OF THE INVENTION

The present invention is an ester/urethane acrylate hybrid oligomer which can be effectively utilized in coating compositions. A coating composition prepared from the present oligomer exhibits low viscosity while also maintaining sufficient stain resistance and flexibility. The hybrid oligomer of the invention comprises the reaction product of (a)an acrylate/hydroxy-functional polyester, (b)an isocyanate compound, and (c)a hydroxy-functional acrylate compound. The acrylate/hydroxy-functional polyester is prepared by reacting an acrylate compound and a polyester polyol. It has been discovered that a polyester polyol backbone having both ester and urethane linkages to acrylate functionality can be utilized as an effective low viscosity oligomer in radiation-curable coating compositions. A typical radiation-curable coating composition contains the ester/urethane acrylate hybrid oligomer, a reactive diluent system and a photoinitiator.

DETAILED DESCRIPTION OF THE INVENTION

The present invention is an ester/urethane acrylate hybrid oligomer comprising the reaction product of (a) an acrylate/hydroxy-functional polyester, (b) an isocyanate compound, and (c) a hydroxy-functional acrylate compound.

The acrylate/hydroxy-functional polyester of the present invention can be prepared by reacting a polyester polyol and an acrylate compound. The polyester polyols that may be utilized in the invention are condensation polymers prepared by reacting a polycarboxylic acid (or anhydride thereof) or lactone with an excess of a multi-functional hydroxy compound.

Polycarboxylic acids which may be employed in forming the polyester polyols which are suitable for use in the present invention consist primarily of monomeric aliphatic, cycloaliphatic or aromatic acid carboxylic acids having at least two carboxyl groups or their anhydrides having from 2 to 14 carbon atoms per molecule, with dicarboxylic acids or their anhydrides being currently preferred. Among such useful acids are phthalic acid, isophthalic acid, terephthalic acid, tetrahydrophthalic acid, hexahydrophthalic acid, adipic acid, succinic acid, suberic acid, azelaic acid, sebacic acid, maleic acid, glutaric acid, chlorendic acid, tetrachlorophthalic acid, itaconic acid, trimellitic acid, tricarballylic acid, other known polycarboxylic acids of varying types and combinations thereof. It is currently preferred that the polyester polyol include phthalic acid or anhydride as at least part of the acid component.

The multi-functional hydroxy compounds utilized to prepare the polyester polyols of the invention can be any diol, triol or the like traditionally utilized to prepare polyester polyols. Examples of multi-functional hydroxy compounds include ethylene glycol, diethylene glycol, neopentyl glycol, 1,4-butane diol, 1,3-propane diol, 1,6-hexane diol, 2-methyl-1,3-propane diol, trimethylol propane, cyclohexanedimethanol, glycerol, erythritol, pentaerythritol, poly(ethylene oxide) diol, poly(ethylene oxide/propylene oxide) diol, polypropylene glycol, poly(tetramethylene oxide) diol and combinations thereof.

Illustrative of suitable carboxylic acid-based polyester polyols are poly(tetramethylene adipate)diol; poly(ethylene succinate)diol; poly(1,3-butylene sebacate)diol; poly(hexylene phthalate)diol; 1,3-butylene glycol/glycerin/adipic acid/isophthalic acid) diols and triols; 1,6-hexane diol phthalate polyester diol; 1,6-hexane diol adipate diol; 1,6-hexane diol ethylene glycol adipate diol; diethylene glycol phthlate diol and the like.

The polyester polyols of the invention may also be prepared by reacting a suitable lactone with the multifunctional hydroxy compound defined above according to methods known in the art. Lactones useful for this purpose typically have the following formula:

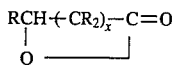

wherein R is hydrogen or an alkyl group having from 1 to 12 carbon atoms, x is from 4 to 7 and at least (x-2) R's are hydrogen. Preferred lactones are the epsilon-caprolactones wherein x is 4 and at least 6 of the R's are hydrogen with the remainder, if any, being alkyl groups. Preferably, none of the substituents contain more than 12 carbon atoms and the total number of carbon atoms in these substituents on the lactone ring does not exceed 12. Unsubstituted epsilon-caprolactone, i.e., where all the R's are hydrogen, is a derivative of 6-hydroxyhexanoic acid. Both the unsubstituted and substituted epsilon-caprolactones are available by reacting the corresponding cyclohexanone with an oxidizing agent such as peracetic acid.

Substituted epsilon-caprolactones found to be most suitable are the various epsilon-monoalkylcaprolactones wherein the alkyl groups contain from 1 to 12 carbon atoms, e.g., epsilon-methylcaprolactone, epsilon-ethylcaprolactone, epsilon-propylcaprolactone and epsilon-dodecylcaprolactone. Useful also are the epsilon-dialkylcaprolactones in which the two alkyl groups are substituted on the same or different carbon atoms, but not both on the omega carbon atoms. Also useful are the epsilon-trialkylcaprolactones wherein 2 or 3 carbon atoms in the lactone ring are substituted provided, though, that the omega carbon atom is not disubstituted. The most preferred lactone starting reactant is the epsilon-caprolactone wherein x in the formula is 4 and all the R's are hydrogen.

Examples of commercially available lactone-based polyester polyols include those based on diethylene glycol, trimethylol propane, and neopentyl glycol sold by Union Carbide Corporation under the tradenames TONE 0200, 0300, and 2200 series, respectively.

The molecular weight of the polyester polyols of the invention typically ranges from about 250 to 3000, preferably from about 350 to 1000.

The acrylate compound useful for reacting with the polyester polyols to form the acrylate/hydroxy-functional polyester can be any acrylate compound corresponding to the formula:

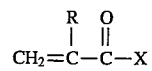

wherein R can be H or $CH_3$; X can be OH, OY, Cl, Br or F and Y can be an alkyl, aryl or cycloalkyl hydrocarbon radical having from 1 to 10, preferably from 1 to 5, carbon atoms. R is preferably H and X is preferably OH. The acrylate compound can also be the anhydrides of compounds corresponding to the above structure where X=OH.

Examples of acrylate compounds of the invention include acrylic acid, methacrylic acid, methyl acrylate, ethyl acrylate, butyl acrylate, hexyl acrylate, cyclohexyl acrylate, phenoxyethyl acrylate, methyl methacrylate, acryloyl chloride, acrylic anhydride, and methacrylic anhydride, with acrylic acid being preferred.

The acrylate/hydroxy-functional polyester can be prepared by reacting the polyester polyol with the acrylate compound in an acrylate:hydroxy group equivalence ratio ranging from about 0.01:1.0 to 0.99:1.0, preferably ranging from about 0.3:1.0 to 0.8:1.0. When X=OH in the structure given above for the acrylate compound, the acrylate compound and the polyester polyol may be reacted in a direct esterification reaction. The esterification reaction typically utilizes an acid catalyst. Typical acid catalysts useful for this purpose include sulfuric acid, p-toluene sulfonic acid, methane sulfonic acid, cation ion exchange resins and mixtures thereof, with methane sulfonic acid and a mixture of methane sulfonic acid and a cation exchange resin being presently preferred. An acid catalyst is typically utilized in an amount ranging from about 0.10 to 5.0, preferably from about 0.25 to 1.0, percent by weight of the total ingredients utilized to prepare the acrylate/hydroxy-functional polyester. The esterification reaction may also utilize a polymerization inhibitor such as methyletherhydroquinone, toluhydroquinone or phenothiazine, and the reaction may be carried out in the presence of a hydrocarbon solvent such as toluene, which forms an azeotrope with water. The reaction is heated at reflux temperature and the water formed is removed, driving the equilibrium to the left.

When X=OY in the structure give above, the acrylate compound and the polyester polyol may be reacted in a transesterification reaction. Transesterification catalysts such as tin or titanate salts are typically utilized in this process. When X=Cl, Br, or F, the acrylate compound and polyester polyol may be reacted in the presence of a base catalyst.

The acrylate/hydroxy-functional polyester is utilized in an amount ranging from about 10 to 90, preferably from about 40 to 70, percent by weight of the essential ingredients utilized to prepare the acrylate hybrid oligomer. The essential ingredients utilized to prepare the acrylate hybrid oligomer herein refers to the acrylate/hydroxy-functional polyester, the isocyanate compound, and the hydroxy-functional acrylate compound.

The isocyanate compound utilized to prepare the acrylate hybrid oligomer of the present invention can be any organic isocyanate compound having at least two free isocyanate groups. Included within the purview of suitable polyisocyanates are aliphatic, cycloaliphatic, and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention.

Suitable polyisocyanates include, without limitation, toluene-2,4-diisocyanate, 2,2,4-trimethylhexamethylene-1,6-diisocyanate, hexamethylene-1,6-diisocyanate, diphenylmethane-4,4-diisocyanate, triphenylmethane-4,4', 4''-triisocyanate, polymethylene polyphenylisocyanate, m-phenylene diisocyanate, p-phenylene diisocyanate, 2,6-toluene diisocyanate, 1,5-naphthalene diisocyanate, naphthalene-1,4-diisocyanate, diphenylene-4,4'-diisocyanate, 1,4-cyclohexylene dimethylene diisocyanate, xylene-1,4-diisocyanate, xylene-1,3-diisocyanate, cyclohexyl-1,4-diisocyanate, 4,4'-methylene-bis(cyclohexyl isocyanate), 3,3'-dimethyldiphenylmethane-4,4'- diisocyanate, isophorone diisocyanate, m-tetramethyl xylene diisocyanate, the product obtained by reacting trimethylol propane and 2,4-toluene diisocyanate in a ratio of 1:3, isocyanurate and biruet adducts of hexamethylene-1,6-diisocyanate and the like. The diisocyanate compounds are preferred, with 4,4'-methylene-bis(cyclohexyl isocyanate) being especially preferred.

The isocyanate compound is typically utilized in an amount ranging from about 5 to 40, preferably from about 10 to 30, percent by weight of the essential ingredients utilized to prepare the acrylate hybrid oligomer.

The hydroxy-functional acrylate compound utilized to prepare the acrylate hybrid oligomer can be any acrylate compound characterized by the presence of an isocyanate-reactive hydroxy group. Examples of suitable hydroxy-functional acrylate compounds include 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 3-hydroxypropyl acrylate, 4-hydroxybutyl acrylate, 3-hydroxypentyl acrylate, 6-hydroxynonyl acrylate, 3-hydroxypropyl methacrylate, 2-hydroxypentyl methacrylate, 5-hydroxypentyl methacrylate, 7-hydroxyheptyl methacrylate, 5-hydroxydecyl methacrylate, N-hydroxymethyl acrylamide, N-hydroxymethyl methacrylamide, diethylene glycol monoacrylate, diethylene glycol monomethacrylate, glycerin dimethacrylate, trimethylol propane dimethacrylate, alkoxylated hydroxyethyl acrylate, trimethylolpropane diacrylate, alkoxylated trimethylolpropane diacrylate, reaction products of polyether glycols of acrylic or methacrylic acid and the like.

The preferred hydroxy-functional acrylate compounds of the invention are lactone-modified acrylate or methacrylate acid esters (hereinafter "lactone-acrylate adducts") prepared by reacting an appropriate lactone with a hydroxy-functional acrylate compound defined in the preceding paragraph as is known in the art. Lactones employed in the preparation of the lactone-acrylate adducts may be the same as the lactones defined above with respect to the preparation of the lactone-based polyester polyols.

A molar ratio of the lactone to hydroxyl groups in the hydroxy-functional acrylate compound of from about 1:0.1 to about 1:5, preferably from about 1:0.3 to about 1:3, is used to prepare the lactone-acrylate adduct. Generally, a temperature of from about 25° C. to about 150° C., preferably from about 25° C. to about 100° C., is used. Times of reaction vary depending upon the temperature and catalyst used; however, generally, the reaction is allowed to proceed from about 20 minutes to about 10 hours, preferably from about 20 minutes to about 5 hours. Suitable catalysts include sulfuric acid, paratoluene sulfonic acid, stannous octoate and butyl titanate.

An example of a lactone-acrylate adduct preferred for use in the present invention is a 2-hydroxyethyl acrylate-caprolactone adduct such as TONE M-100 supplied by Union Carbide Corporation.

The hydroxy-functional acrylate compound is typically utilized in an amount ranging from about 5 to 50, preferably about 15 to 40, percent by weight of the essential ingredients utilized to prepare the acrylate hybrid oligomer.

The acrylate hybrid oligomers of the present invention can be prepared by any of several known reaction routes, including, (1) simultaneous reactions of acrylate/hydroxy-functional polyester, isocyanate compound and hydroxy-functional acrylate compound; (2) reaction of isocyanate compound and hydroxy-functional acrylate compound to form an unsaturated isocyanate-functional compound which is then reacted with the acrylate/hydroxy-functional polyester, the amount of unsaturated isocyanate being sufficient to consume all hydroxyl groups of the acrylate/hydroxy-functional polyester, with any excess isocyanate moieties being preferentially reacted with additional hydroxy-functional acrylate compound; and (3) reaction of isocyanate compound and acrylate/hydroxy-functional polyester to form a prepolymer, which is then reacted with the hydroxy-functional acrylate compound.

The hybrid oligomers of the invention can be prepared neat, as can the intermediates in the multi-step processes, or can be prepared in the presence of a diluent phase, such as a reactive diluent system described hereinafter that is copolymerizable with the acrylate hybrid oligomer but is otherwise inert during the particular process of preparing the oligomers. A tin catalyst such as stannous octoate may be utilized during the preparation of the oligomers, particularly during the reaction of the isocyanate compound with other materials.

Prior to utilization of the hybrid oligomer in a coating composition, any acid catalyst utilized in a direct esterification reaction as described above to prepare the acrylate/hydroxy-functional polyester is preferably neutralized so as to avoid any discoloration caused by any residual acid compound. In order to neutralize the acid catalyst, the final oligomer may be washed with an aqueous solution of a base such as sodium hydroxide or bicarbonate or by exposing the oligomer to a basic ion exchange resin. The acid catalyst may also be neutralized by exposing the oligomer to a solution of a lower alkanol such as methanol and a base such as potassium hydroxide.

It has also been presently discovered that the acid catalyst may be neutralized by incorporating amine functionality into the acrylate hybrid oligomer itself. Specifically, the amine functionality would be introduced by reacting a hydroxy-functional tertiary amine compound with the isocyanate compound to incorporate it into the final acrylate hybrid oligomer. The hydroxy-functional tertiary amine compound can be any tertiary amine containing at least one hydroxy group. Examples of the hydroxy-functional tertiary amine compound useful for introducing amine functionality into the hybrid oligomer include n-butyldiethanol amine, propyl and isopropyldiethanol amine, ethyldiethanol amine, methyldiethanol amine, dibutylethanol amine, diethylethanol amine, bis (2-hydroxyethyl) cocoamine, bis (2-hydroxyethyl aniline) and the like.

The hydroxy-functional tertiary amine compound, if utilized, is typically employed in an amount ranging from about 0.1 to 2.0, preferably from about 0.3 to 1.0, percent by weight of the total ingredients utilized to prepare the acrylate hybrid oligomer.

In the preparation of a radiation-curable coating composition, the acrylate hybrid oligomer is typically utilized in combination with a reactive diluent system and a photoinitiator as described above. Broadly, suitable reactive diluent systems comprise at least one unsaturated addition polymerizable monomer which is copolymerizable with the acrylate hybrid oligomer upon exposure to radiation. The reactive diluent can be monofunctional or polyfunctional. A single polyfunctional diluent can be used, as can mixtures thereof; or a combination of one or more monofunctional reactive diluents and one or more polyfunctional reactive diluents can be used. Particularly preferred reactive diluents are unsaturated addition-polymerizable monofunctional and polyfunctional acrylic monomers. Acrylic monomers useful as a reactive diluent system are well known and examples of such monomers include isobornyl acrylate, phenoxyethyl acrylate, isodecyl acrylate, hexyl acrylate, cyclohexyl acrylate, 2-ethylhexyl acrylate, octyl acrylate, nonyl acrylate, stearyl acrylate, 2-phenoxy acrylate, 2-methoxyethyl acrylate, lactone modified esters of acrylic and methacrylic acid, methyl methacrylate, butyl acrylate, isobutyl acrylate, methacrylamide, allyl acrylate, tetrahydrofuryl acrylate, n-hexyl methacrylate, 2-(2-ethoxyethoxy)ethyl acrylate, n-lauryl acrylate, 2-phenoxyethyl acrylate, glycidyl methacrylate, glycidyl acrylate, acrylated methylolmelamine, 2-(N,N-diethylamino)-ethyl acrylate, neopentyl glycol diacrylate, alkoxylated neopentyl glycol diacrylate, ethylene glycol diacrylate, hexylene glycol diacrylate, diethylene glycol diacrylate, tripropylene glycol diacrylate, tetraethylene glycol diacrylate, pentaerythritol di-, tri-, tetra-, or pentaacrylate, trimethylolpropane triacrylate, alkoxylated trimethylol-propane triacrylate which contains from 2 to 14 moles of either ethylene or propylene oxide, triethylene glycol diacrylate, tetraethylene glycol diacrylate, polyethylene glycol diacrylate, 1,3-butylene glycol diacrylate, 1,4-butanediol diacrylate, 1,6-hexanediol diacrylate, polyethylene glycol diacrylate, combinations thereof, and any corresponding methacrylates thereof. The reactive diluent system typically comprises from about 10 to 65, preferably from about 15 to 45, most preferably from about 20 to 30, percent by weight of the total radiation-curable coating composition.

It should be noted that the inherently low viscosity of the hybrid oligomer of the present invention allows the reactive diluent system to be utilized in much lower amounts than have been traditionally utilized in radiation-curable compositions. Traditional radiation-curable compositions typically require from about 70 to 90 percent by weight of reactive diluent system in order to maintain a viscosity low enough for practical utilization.

The photoinitiator can be by any of the known photoinitiators such as benzophenone, benzoin, acetophenone, benzoin methyl ether, Michler's ketone, benzoin butyl ether, xanthone, thioxanthone, propiophenone, fluorenone, carbozole, diethyoxyacetophenone, the 2-, 3- and 4- methylacetophenones and methoxyacetophenones, the 2- and 3-chloroxanthones and chlorothioxanthones, 2-acetyl-4-methylphenyl acetate, 2,2'-dimethyoxy-2-phenylacetophenone, benzaldehyde, fluorene, anthraquinone, triphenylamine, 3- and 4-allyl-acetophenone, p-diacetylbenzene, 3-chloro-2-nonylxanthone, 2-chlorobenzophenone, 4-methoxybenzophenone, 2,2',4,4'-tetrachlorobenzophenone, 2-chloro-4'-methylbenzophenone, 4-chloro-4'-methylbenzophenone, 3-methylbenzophenone, 4-tert-butyl-benzophenone, isobutyl ether, benzoic acetate, benzil, benzilic acid, amino benzoate, methylene blue, 2,2-diethoxyacetophenone, 9,10-phenanthrenequinone, 2-methyl anthraquinone, 2-ethyl anthraquinone, 1-tert-butyl-anthraquinone, 1,4-naphthoquinone, isopropylthioxanthone, 2-chlorothioxanthone, 2-iso-propylthioxanthone, 2methylthioxanthone, 2-decylthioxanthone, 2-dodecyl-thioxanthone, 2-methyl-1-[4-(methyl thio)phenyl)]-2-morpholinopropanone-1, combinations thereof and the like. The photoinitiator or combination of photoinitiators is typically utilized in an amount ranging from about 0.5 to 15, preferably from about 1 to 5 percent by weight of the radiation-curable coating composition.

A radiation-curable composition containing the acrylate hybrid oligomers of the present invention may also contain other optional ingredients known to those skilled in the art of radiation-curable compositions. Examples of additional optional components include inhibitors, monomers, flow additives, adhesion promoters, flatting agents, pigments, and optical brighteners.

Radiation-curable compositions can be applied to a surface to be coated or bonded by various techniques well known in the art. After application of the coating to a surface, polymerization of the coating is initiated. The polymerization may be initiated by any method or means known in the art for initiating radiation-curable materials. At the present time, it is preferred to initiate polymerization of the coating by exposing the coating to any source of actinic radiation at a wavelength within the ultraviolet or visible spectral regions. Suitable sources of radiation include mercury, xenon, carbon arc and tungsten filament lamps, sunlight, etc. Exposures may be from less than about 1 second to 10 minutes or more depending upon the amounts of particular polymerizable materials and photoinitiators being utilized and depending upon the radiation source and distance from the source. The compositions may also be polymerized by exposure to electron beam irradiation in a dosage typically ranging from less than about 1 megarad to 100 megarad or more. Generally speaking, the rate of polymerization increases with increasing amounts of photoinitiator at a given light exposure or electron beam irradiation and also increases with increasing light intensity or electron dosage at a given level of photoinitiator. The use of thermal energy during or after exposure to a radiation source will also generally accelerate the curing reaction, and even a moderate increase in temperature may greatly accelerate cure rate.

A radiation-curable composition based on the acrylate hybrid oligomers of the present invention can be used in essentially any type of radiation-curable coating or adhesive application known in the art. For example, the radiation-curable composition can be utilized as coatings for resilient flooring such as vinyl sheet goods or tile, and for other applications such as coatings for plastic, thread, paper, wood or metal.

The following examples are provided for purposes of illustrating the invention and should not be construed in any manner to limit the scope of the invention, which is defined by the claims.

EXAMPLE 1

To a 2-liter, 4-neck round bottom flask equipped with a stirrer, condenser, vacuum line, thermocouple, and a gas inlet are added 900 grams (3.6 eqv.) of a diethylene glycol phthalate polyester polyol (STEPANPOL-Stepan Company) of 500 average MW, 480 grams of toluene, and 0.32 grams of toluhydroquinone. The resulting mixture is heated to 93° C. with a dry air sparge and 8.2 grams of methane sulfonic acid and a portion of acrylic acid is added. Reflux is maintained with vacuum to remove water which is formed in the reaction. Over the period of four hours, a total of 220 grams (3.05 eqv.) acrylic acid is added. The reaction is continued until 80 to 85 percent of the acrylic acid added is consumed as determined by acid number. This corresponds to a reaction ratio of acid to hydroxyl groups of about 0.70. The toluene and excess acrylic acid are then stripped off under vacuum at 100° C.

To 800 grams of the acrylate/hydroxy-functional polyester prepared above is added 212 grams of 4,4'-methylene-bis(cyclohexyl isocyanate) (DESMODUR W- Miles Corporation) along with 0.12 grams of toluhydroquinone, and the mixture is allowed to react until any exotherm subsides. At this point, 8.5 grams of n-butyldiethanol amine is added to neutralize the acid catalyst and the reaction is continued at 65° C. until the theoretical value of free NCO is reached. Then 264 grams of 2-hydroxyethyl acrylate-caprolactone adduct (TONE M-100 - Union Carbide Corporation) are added and the reaction is continued until the free NCO content is less than 0.20 percent so as to prepare the acrylate hybrid oligomer.

EXAMPLE 2

To a vessel equipped as in Example 1 is added 1,160 grams of a diethylene glycol phthalate polyester polyol (STEPANPOL) of 1228 MW along with 320 grams of LACTOL SPIRITS solvent (available from AMSCO Division of Union Oil of California) and 0.12 grams of phenothiazine. The resultant mixture is heated with a dry nitrogen sparge and 77 grams of acrylic acid and 7.8 grams of methane sulfonic acid are added. The temperature is kept at 94° C. to maintain a rapid reflux. After five hours, the evolution of water slowed down and 29 additional grams of acrylic acid are added. The reaction is continued until the amount of water recovered is equivalent to an acid:hydroxyl group reaction ratio of 0.50. The solvent and excess acrylic acid are then stripped off under vacuum at 100° C.

One hundred five grams of DESMODUR W along with 0.12 grams of toluhydroquinone is allowed to react with 132.4 grams of TONE M-100 at 65° C. until the free NCO content is less than 7.2 percent. The 561.1 grams of the acrylate/hydroxy-functional polyester prepared above is added in portions over a period of two hours while the temperature is maintained between 60° C. and 70° C. Stannous octoate catalyst is added dropwise throughout the course of the above two reactions. At this point, 1.6 grams of n-butyldiethanol amine is added and the reaction is continued at 65° C. to 75° C. until the free NCO content is less than 0.20 percent so as to prepare the acrylate hybrid oligomer.

EXAMPLE 3

To a vessel equipped as in Example 1 is added 1,186 grams of a diethylene glycol phthalate polyester polyol (STEPANPOL) of 1,228 MW along with 320 grams of LACTOL SPIRITS solvent and 0.12 grams of phenothiazine.

The resultant mixture is heated with a dry nitrogen sparge and 125 grams of acrylic acid and 7.8 grams of methane sulfonic acid are added. The temperature is kept at 94° C. to maintain a rapid reflux. After eight hours, the evolution of water slowed down and 52 additional grams of acrylic acid are added. The reaction is continued until the amount of water recovered is equivalent to an acid:hydroxyl group reaction ratio of 0.90. The solvent and excess acrylic acid are then stripped off under vacuum at 100° C.

Twenty grams of DESMODUR W, along with 0.05 grams of toluhydroquinone, is allowed to react with 9.0 grams of 2-hydroxy-ethyl acrylate and 469.7 grams of the acrylate/hydroxy-functional polyester prepared above, while the temperature is maintained between 60° and 70° C. Then 0.3 grams of n-butyldiethanol amine is added and the reaction is continued at 65° to 75° C. until the free NCO content is less than 0.20 percent so as to prepare the acrylate hybrid oligomer.

EXAMPLE 4

To a vessel equipped as in Example 1 is added 1,133 grams of a diethylene glycol phthalate polyester polyol (STEPANPOL) of 425 MW along with 320 grams of LACTOL SPIRITS solvent and 0.12 grams of phenothiazine. The resultant mixture is heated with a dry nitrogen sparge, and 195.6 grams of acrylic acid and 7.8 grams of methane sulfonic acid are added. The temperature is kept at 94° C. to maintain a rapid reflux. After six hours, the evolution of water slows down and 71 additional grams of acrylic acid are added. The reaction is continued until the amount of water recovered is equivalent to an acid:hydroxyl group reaction ratio of 0.50. The solvent and excess acrylic acid are then stripped off under vacuum at 100° C.

One hundred twenty-two grams of DESMODUR W along with 0.12 grams of toluhydroquinone is allowed to react with 159.2 grams of TONE M-100 at 65° C. until the free NCO content is less than 7.2 percent. Then 216.5 grams of the acrylate/hydroxy-functional polyester prepared above is added, along with stannous octoate catalyst, and then 1.8 grams of n-butyldiethanol amine is added. The reaction is continued at 65° to 75° C. until the free NCO content is less than 0.20 percent so as to prepare the acrylate hybrid oligomer.

EXAMPLE 5

To a vessel equipped as in Example 1 is added 1,038 grams of a diethylene glycol phthalate polyester polyol (STEPANPOL) of 425 MW, along with 320 grams of LACTOL SPIRITS solvent and 0.12 grams of phenothiazine. The resultant mixture is heated with a dry nitrogen sparge, and 322.5 grams of acrylic acid and 7.8 grams of methane sulfonic acid are added. The temperature is kept at 94° C. to maintain a rapid reflux. After eight hours, the evolution of water slows down and 138 additional grams of acrylic acid are added. The reaction is continued until the amount of water recovered is equivalent to an acid:hydroxyl group reaction ratio of 0.90. The solvent and excess acrylic acid are then stripped off under vacuum at 100° C.

Eighty grams of DESMODUR W, along with 0.11 grams of toluhydroquinone is allowed to react with 34.4 grams of 2-hydroxyethyl acrylate and 634.7 grams of the acrylate/hydroxy-functional polyester prepared above is added in portions over two hours while the temperature is maintained between 60° and 70° C. Then 1.19 grams of n-butyldiethanol amine is added and the reaction is continued at 65° to 75° C. until the free NCO content is less than 0.20 percent so as to prepare the acrylate hybrid oligomer.

EXAMPLE 6

Fifty grams of isophorone diisocyanate along with 0.04 gram of toluhydroquinone is allowed to react with 34.2 grams of 2-hydroxyethyl acrylate at 70° C. to an NCO content of 7.7 percent. To the resulting reaction product is added 315.4 grams of the acrylate/hydroxy-functional polyester of Example 5 in portions over ten minutes while the temperature is maintained between 50° and 70° C. Three drops of stannous octoate and 0.6 gram of butyl diethanolamine are then added. The reaction is heated to 69° C. for three hours until the free NCO is less than 0.20 percent so as to prepare the acrylate hybrid oligomer.

Preparation and Testing of Radiation-Curable Coating Compositions

Formulations are prepared from the oligomers of Examples 1–6 using propoxylated neopentyl glycol diacrylate (SARTOMER SR9003—Sartomer Chemical Company) as a reactive diluent monomer at 25 percent by weight along with a standard package of photoinitiator and additives. Viscosities of the formulations are taken on a Brookfield viscometer. The compositions are coated onto sheet vinyl substrate to provide 1.5 mil films. The coated substrates are cured by exposure under a nitrogen atmosphere to ultraviolet radiation employing an intensity of 200 Watts per inch at a line speed of 30 feet/minute. All compositions are cured in a single pass.

The cured coatings are evaluated for stain resistance and flexibility by mandrel bend according to ASTM D-522 standard test procedures. Flexibility is rated from 0 to 4 with the materials passing the severe ⅛-inch bend test without cracking being given a rating of 0 (most flexible) and those failing the much less severe ½-inch bend test being given a rating of 4 (least flexible).

The cured coatings are evaluated for stain resistance by applying various staining materials to a one-inch square area of the coated vinyl substrate and allowing the material to remain on the substrate for approximately two hours. The staining materials are then wiped from the substrate, first with a dry towel and then with a mineral spirits solvent. The staining materials include shoe polish, RIT dye, iodine, mustard, cold tar sealant and DUPONT N oil base. The amount of stain remaining on the vinyl substrate after cleaning is rated on a scale of 0 to 4 for each staining material. A rating of 0 indicates essentially no stain with a rating of 4 indicating maximum stain. The coatings are given a total score based on all staining materials, with a total score of 24 indicating maximum stain for all six staining materials.

The results of the above tests and viscosity measurements are given below in Table 1.

TABLE 1

| COATING | OLIGOMER | STAIN | FLEXI-BILITY | VISCOSITY (CPS) |
|---|---|---|---|---|
| A | Example 1 | 3.0 | 0 | 1,532 |
| B | Example 2 | 9.5 | 0 | 20,700 |
| C | Example 3 | 4.5 | 0 | 3,580 |
| D | Example 4 | 2.5 | 0 | 8,120 |
| E | Example 5 | 4.5 | 0 | 600 |
| F | Example 6 | 2.5 | 0 | 894 |

As can be seen from the above data, the acrylate hybrid oligomers of the present invention can be utilized to produce radiation-curable coating compositions having viscosities well below 100,000 cps and having excellent flexibility and stain resistance.

What is claimed is:

1. An ester/urethane acrylate hybrid oligomer comprising the reaction product of (a) an acrylate/hydroxy-functional polyester, (b) an isocyanate compound, and (c) a hydroxy-functional acrylate compound, wherein the acrylate/hydroxy-functional polyester is preformed prior to reacting the acrylate/hydroxy-functional polyester with the isocyanate compound and the hydroxy-functional acrylate compound and wherein the acrylate/hydroxy-functional polyester is prepared by reacting an acrylate-forming compound and a polyester polyol, wherein the acrylate-forming compound corresponds to the formula:

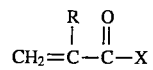

wherein R can be H or $CH_3$; X can be OH, OY, Cl, Br or F; and Y can be an alkyl, aryl or cycloalkyl hydrocarbon radical having from 1 to 10 carbon atoms; and the polyester polyol is prepared by reacting a polycarboxylic acid (or anhydride thereof) or lactone with an excess of a multi-functional hydroxy compound, wherein the polycarboxylic acid is selected from the group consisting of phthalic acid, isophthalic acid, terephthalic acid, tetrahydrophthalic acid, hexahydrophthalic acid, adipic acid, succinic acid, suberic acid, azelaic acid, sebacic acid, maleic acid, glutaric acid, chlorendic acid, tetrachlorophthalic acid, itaconic acid, trimellitic acid and tricarballylic acid, the lactone corresponds to the formula:

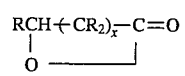

wherein R is hydrogen or an alkyl group having from 1 to 12 carbon atoms, x is from 4 to 7 and at least (x-2)R's are hydrogen, and the multi-functional hydroxy compound is selected from the group consisting of ethylene glycol, diethylene glycol, neopentyl glycol, 1,4-butane diol, 1,3-propane diol, 1,6-hexane diol, 2-methyl-1,3,propane diol, trimethylol propane, cyclohexanedimethanol, glycerol, erythritol, pentaerythritol, poly(ethylene oxide) diol, poly(ethylene oxide/propylene oxide) diol, polypropylene glycol, and poly(tetramethylene oxide) diol, the isocyanate compound is selected from the group consisting of toluene-2,4-diisocyanate, 2,2,4-trimethyl-hexamethylene-1,6-diisocyanate, hexamethylene-1,6-diisocyanate, diphenylmethane-4,4'-diisocyanate, triphenylmethane-4,4',4"-triisocyanate, polymethylene polyphenylisocyanate, m-phenylene diisocyanate, p-phenylene diisocyanate, 2,6-toluene diisocyanate, 1,5-naphthalene diisocyanate, naphthalene-1,4-diisocyanate, 1,4-cyclohexylene dimethylene diisocyanate, xylene-1,4-diisocyanate, xylene-1,3-diisocyanate, cyclohexyl-1,4-diisocyanate, 4,4'-methylene-bis(cyclohexyl isocyanate), 3,3'-dimethyldiphenylmethane-4,4'-diisocyanate, isophorone diisocyanate, m-tetramethyl xylene diisocyanate, the product obtained by reacting trimethylol propane and 2,4-toluene diisocyanate in a ratio of 1:3, and isocyanurate and biuret adducts of hexamethylene-1,6-diisocyanate, and the hydroxy-functional acrylate compound is selected from the group consisting of 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 3-hydroxypropyl acrylate, 4-hydroxybutyl acrylate, 3-hydroxypentyl acrylate, 6-hydroxynonyl acrylate, 3-hydroxypropyl methacrylate, 2-hydroxypentyl methacrylate, 5-hydroxypentyl methacrylate, 7-hydroxyheptyl methacrylate, 5-hydroxydecyl methacrylate, N-hydroxymethyl acrylamide, N-hydroxymethyl methacrylamide, diethylene glycol monoacrylate, diethylene glycol monomethacrylate, glycerin dimethacrylate, trimethylol propane dimethacrylate, alkoxylated hydroxyethyl acrylate, trimethylolpropane diacrylate, alkoxylated trimethylolpropane diacrylate, a lactone-acrylate adduct, and reaction products of polyether glycols with acrylic acid or methacrylic acid.

2. An acrylate hybrid oligomer according to claim 1 wherein the polyester polyol is selected from the group consisting of poly(tetramethylene adipate)diol; poly(ethylene succinate)diol; poly(1,3-butylene sebacate)diol; poly(hexylene phthalate)diol; 1,3-butylene glycol/glycerin/adipic acid/isophthalic acid) diols and triols; 1,6-hexane diol phthalate polyester diol; 1,6-hexane diol adipate diol; 1,6-hexane diol ethylene glycol adipate diol; and diethylene glycol phthlate diol.

3. An acrylate hybrid oligomer according to claim 1 wherein the acrylate forming compound is selected from the group consisting of acrylic acid, methacrylic acid, methyl acrylate, ethyl acrylate, butyl acrylate, hexyl acrylate, cyclohexyl acrylate, phenoxyethyl acrylate, methyl methacrylate, acryloyl chloride, acrylic anhydride, and methacrylic anhydride.

4. An acrylate hybrid oligomer according to claim 3 wherein the acrylate forming compound is acrylic acid.

5. An acrylate hybrid oligomer according to claim 1 wherein the polyester polyol and the acrylate forming compound are reacted in an acrylate:hydroxyl group equivalence ratio ranging from about 0.0 1:1.0 to 0.99: 1.0.

6. An acrylate hybrid oligomer according to claim 5 wherein the ratio ranges from about 0.3:1.0 to 0.8:1.0.

7. An acrylate hybrid oligomer according to claim 1 wherein the isocyanate compound is 4,4'-methylene-bis(cyclohexyl isocyanate).

8. An acrylate hybrid oligomer according to claim 1 wherein the hydroxy-functional acrylate compound is a lactone-acrylate adduct prepared by reacting an appropriate lactone with a hydroxy-functional acrylate compound.

9. An acrylate hybrid oligomer according to claim 8 wherein the lactone-acrylate adduct is 2-hydroxyethyl acrylate-caprolactone adduct.

10. An acrylate hybrid oligomer according to claim 1 wherein the reaction product is prepared by reacting from about 10 to 90 percent by weight acrylate/hydroxy-functional polyester, from about 5 to 40 percent by weight isocyanate compound, and from about 5 to 50 percent by weight of hydroxy-functional acrylate compound.

11. An acrylate hybrid oligomer according to claim 10 wherein the acrylate/hydroxy-functional polyester is utilized in an amount ranging from about 40 to 70 percent by weight, the isocyanate compound is utilized in an amount ranging from about 10 to 30 percent by weight, and the hydroxy-functional acrylate compound is utilized in an amount ranging from about 15 to 40 percent by weight.

12. A radiation-curable composition comprising the acrylate hybrid oligomer of claim 1, a reactive diluent system that includes at least one ethylenically unsaturated addition-polymerizable monomer, and a photoinitiator.

* * * * *